United States Patent
Schäffler et al.

(10) Patent No.: US 6,768,972 B1
(45) Date of Patent: Jul. 27, 2004

(54) METHOD AND DEVICE FOR REDUCING A NUMBER OF MEASURED VALUES OF A TECHNICAL SYSTEM

(75) Inventors: Stefan Schäffler, Augsburg (DE); Thomas Sturm, München (DE)

(73) Assignee: Siemens Aktiengesesellschaft, Munich (DE)

( * ) Notice: Subject to any disclaimer, the term of this patent is extended or adjusted under 35 U.S.C. 154(b) by 0 days.

(21) Appl. No.: 09/857,481

(22) PCT Filed: Dec. 1, 1999

(86) PCT No.: PCT/DE99/03834
§ 371 (c)(1),
(2), (4) Date: Jun. 4, 2001

(87) PCT Pub. No.: WO00/33150
PCT Pub. Date: Jun. 8, 2000

(30) Foreign Application Priority Data

Dec. 3, 1998 (DE) ......................... 198 55 877

(51) Int. Cl.[7] .............................................. G06F 15/00
(52) U.S. Cl. ........................................ 702/189; 706/16
(58) Field of Search ........................... 702/189; 706/16; 703/2; 700/181; 435/6; 327/237

(56) References Cited

U.S. PATENT DOCUMENTS

| | | |
|---|---|---|
| 5,226,118 A | 7/1993 | Baker et al. |
| 5,361,628 A * | 11/1994 | Marko et al. ................. 73/116 |
| 5,586,066 A | 12/1996 | White et al. |
| 5,809,490 A * | 9/1998 | Guiver et al. ................. 706/16 |

FOREIGN PATENT DOCUMENTS

| | | |
|---|---|---|
| DE | 29 24 887 C2 | 10/1980 |
| DE | 40 06 948 A1 | 9/1991 |
| DE | 40 39 647 A1 | 6/1992 |
| DE | 41 15 315 A1 | 11/1992 |
| DE | 195 35 719 A1 | 3/1997 |
| DE | 196 33 693 C1 | 11/1997 |
| DE | 196 48 623 C1 | 4/1998 |
| EP | 0 658 833 A1 | 6/1995 |
| EP | 0 843 244 A1 | 5/1998 |
| WO | WO 90/16048 | 12/1990 |
| WO | WO 95/06289 | 3/1995 |

* cited by examiner

Primary Examiner—John Barlow
(74) Attorney, Agent, or Firm—Morrison & Foerster LLP

(57) ABSTRACT

A method and system for screening out empirically data collected from various steps of a technical process operating based on a first set of parameters, by utilizing a screening algorithm to reduce the size of the empirical data set, thus improving the modeling and revising of the technical process. The algorithm utilizes various classes associated with the empirical values and within each class performs an assessment with respect to preselected threshold values. The algorithm also performs an assessment with respect to another preselected threshold value, for the class as a whole.

9 Claims, 3 Drawing Sheets

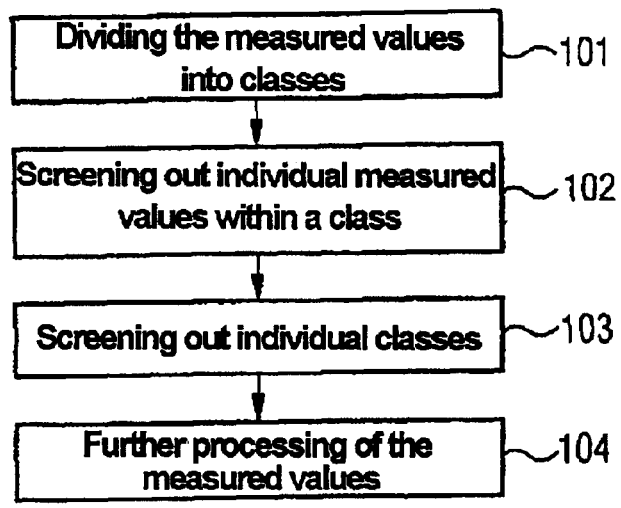
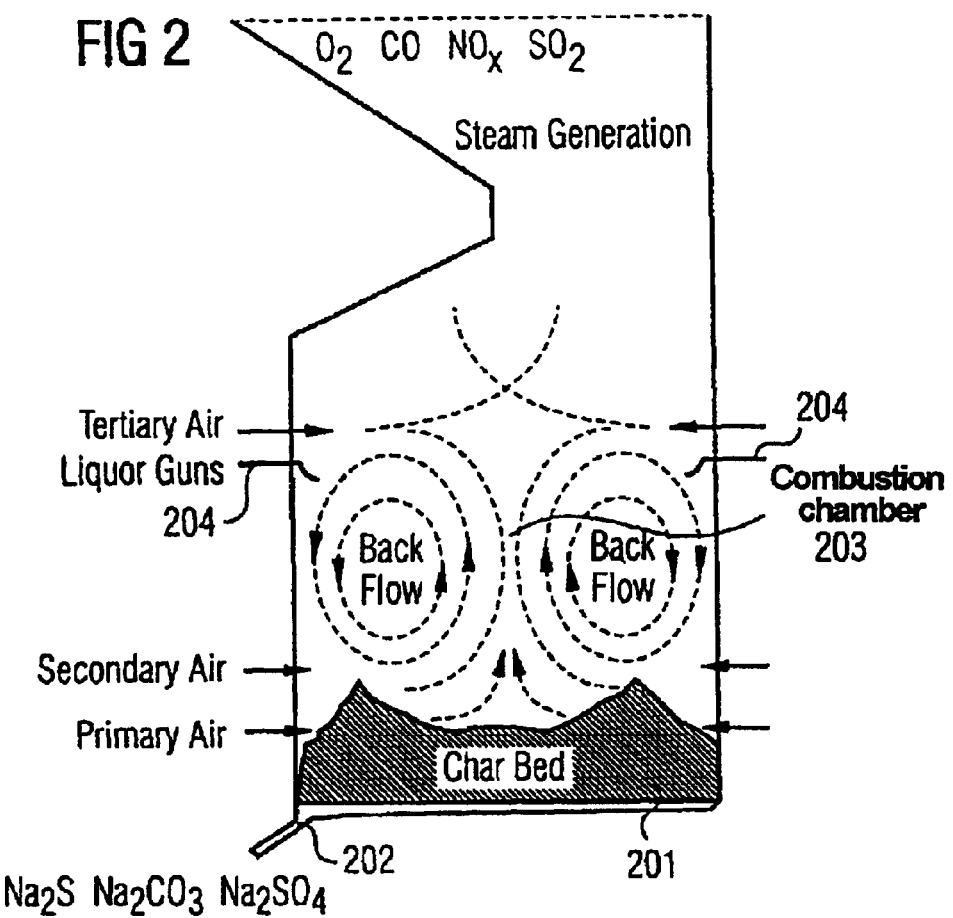

FIG 3

| | Input variables | |
|---|---|---|
| | Measured variable | Description |
| 1 | FI 7081 | BL Flow |
| 2 | QI 7082 A | Dry Solids Content |
| 3 | FIC 7280 X | PA Primary Air |
| 4 | FIC 7281 X | SA Secondary Air |
| 5 | FIC 7282 X | TA Tertiary Air |
| 6 | PI 7283 | PA Pressure |
| 7 | PI 7284 | SA Pressure |
| 8 | PHI 7285 | TA Pressure |
| 9 | TIC 7288 X | PA Temperature |
| 10 | TIC 7289 X | SA Temperature |
| 11 | PIC 7305 X | Press Induced Draft |
| 12 | HO 7338 | Oil Valve |
| 13 | TI 7347 | BL Temperature |
| 14 | PIC 7349 X | BL Front Pressure |
| 15 | PIC 7351 X | BL Back Pressure |

FIG 4

| | Actuating variables | |
|---|---|---|
| | Measured variable | Description |
| 1 | FIC 7280 X | PA Primary Air |
| 2 | FIC 7281 X | SA Secondary Air |
| 3 | FIC 7282 X | TA Tertiary Air |
| 4 | PIC 7349 X | BL Front Pressure |

FIG 5

| | Output variables | |
|---|---|---|
| | Measured variable | Description |
| 1 | TIC 7249 X | Steam Temperature |
| 2 | FI 7250 | Steam Production |
| 3 | QI 7322 | $O_2$ |
| 4 | TI 7323 | Smoke Temperature |
| 5 | QI 7331 | $H_2S$ |
| 6 | QI 7332 | $SO_2$ |
| 7 | QIC 7333 X | CO |
| 8 | QIC 7370 X | Spec. Weight of Green Liquor |
| 9 | QI 7531 | NO |
| 10 | IBM 8096 | Reduction Efficiency |
| 11 | IBM 8109 | PH Value |
| 12 | TI 7352 | Bed Temperature |
| 13 | IBM 8015 | $NaOH$ |
| 14 | IBM 8016 | $Na_2S$ |
| 15 | IBM 8017 | $Na_2CO_3$ |

METHOD AND DEVICE FOR REDUCING A NUMBER OF MEASURED VALUES OF A TECHNICAL SYSTEM

BACKGROUND OF THE INVENTION

1. Field of the Invention

The present inventive method relates to a method and an arrangement for reducing a number of measured values of a technical system.

2. Description of the Related Art

A technical system, for example a process engineering plant, supplies a large quantity of measured values per unit time, using different measured-value pickups (sensors). In the course of a number of days or weeks, a quantity of data accumulates which requires a correspondingly high computational power to process it. If the measured values are to be used to adapt or reset the technical system, operations are often necessary whose complexity admits only some of the measured values. It is then a great disadvantage to select a specific number of measured values arbitrarily from the quantity of all measured values and to process them further, since measured values with low significance, for example measured values with a high degree of interference, have a considerable influence on the overall result and falsify the latter considerably.

SUMMARY OF THE INVENTION

The object of the invention is to specify a method and an arrangement for reducing measured values, it being ensured that the remaining measured values have a high significance with regard to their description of the technical system. In order to achieve the object, a method of reducing a number of measured values of a technical system is specified, in which the measured values are divided into classes in accordance with predefined criteria. The measured values in a class are assessed and those measured values whose assessment lies below a predefined first threshold value are screened out.

Screening out the measured values results in a reduction with regard to the number of measured values. A considerably reduced number of measured values is thus available for further processing. The further processing can be carried out with a lower computational outlay as compared with the non-reduced number of measured values.

In one embodiment, the classes themselves are also assessed. In particular, a class whose assessment lies below a predefined second threshold value can be screened out. This results in an additional reduction in the number of measured values.

In another embodiment, one criterion for the division into classes consists in that, for each class, measured values relating to a predefinition of setting parameters of the technical system are determined. Typically, the technical system is set using a predefined number of setting parameters and after the setting has been carried out, there follows a (mostly time-delayed) reaction of the system to the setting parameters (transient response, transient process of the system). After the setting operation, a specific quantity of measured values which can be associated with the transient process are therefore picked up, measured values which are associated with the predefined set of setting parameters continuing to accumulate after the transient process has concluded (transition to steady-state operation). By adjusting the setting parameters, a new class is determined. All the measured values which respectively accumulate after an adjustment to the setting parameters belong in their own class. Another development consists in that measured values within a class which can be associated with the respective transient process are screened out. In addition, erroneous measured values can be screened out. In many cases, the setting of large technical systems depends on long-term, steady-state operation. Measured values which relate to the transient process (of short duration in comparison with the steady-state operation after the transient process has concluded) are expediently screened out, since measured values for the steady-state operation are falsified by them. In particular within the context of modeling the technical system, the measured data about the steady-state behavior of the technical system are of interest.

One refinement of this embodiment consists in reducing the number of measured values in a class in that at least one representative value for the measured values in the class is determined. Such a representative value may be:

a) an average (e.g. a sliding average) of the measured values of the class, b) a maximum value of the measured values of the class, c) a minimum value of the measured values of the class, d) a median.

In the case of variant (d), one advantage resides in the fact that it is always possible to determine a value which is actually present, while the average (a) does not itself occur as a value.

Depending on the application, a suitable selection for determining the representative value of a class may be made.

An entire class with measured values can be screened out if said class contains less than a predefined number of measured values.

Another refinement consists in that those measured values are screened out which differ from a predefinable value by more than a predefined threshold value.

The predefinable value can be an average of all the measured values of the class or a measured value to be expected in response to the respective setting parameters of the technical system.

A development consists in that the measured values which are reduced in number are used for the simulation and/or the draft design of this or another technical system.

The draft design of the technical system can in this case comprise both adaptation and redrafting of this or another technical system.

In addition, within the context of the simulation, the behavior of the technical system can be checked by using the reduced number of measured values, with the objective of altering the system for developing a new system with altered predefinitions.

In addition, in order to achieve the object, an arrangement for reducing a number of measured values of a technical system is specified which has a processor unit, which processor unit is set up in such a way that the measured values can be divided into classes in accordance with predefined criteria. Measured values in a class can be assessed, measured values whose assessment lies below a predefined first threshold value are screened out.

This arrangement is particularly suitable for carrying out the method according to the invention or one of its developments explained above.

BRIEF DESCRIPTION OF THE DRAWINGS

FIG. 1 shows a block diagram which contains steps in a method for reducing measured values.

FIG. 2 shows a schematic sketch of a recovery boiler.

FIGS. 3 through 5 show input variables, actuating variables and outward variables of the recovery boiler.

DETAILED DESCRIPTION OF THE PREFERRED EMBODIMENTS

FIG. 1 shows a block diagram which contains steps in a method of reducing measured values. In a first step 101, the measured values are divided into classes. In particular, the division into classes is carried out with the effect that all the measured values which belong to one set of setting parameters are combined in one class. To this extent, each alteration to the setting parameters of the technical system found a new class. In particular, altering the setting parameters is associated with a transient process of the technical system, this process, as opposed to a steady-state behavior, containing extreme fluctuations in the measured values. In a step 102, individual measured values within one class are screened out. These may be, for example, erroneous measured values, that is to say measured values which exhibit a high deviation with respect to the other measured values or an average of the measured values or measured values from the transient process. There are a number of possible ways of screening out individual measured values within a class:

1. Measured values which are too poor (based on a predefined comparative value);
2. Measured values which belong to a transient process;
3. Measured values which are erroneous;
4. Determining a representative measured value as a representative for a plurality of measured values, in that the representative measured value is determined as an average of the measured values in a class or as a maximum value or a minimum value of these measured values.

Measured values of this type are preferably not taken into account; they are removed from the respective class. This results in a considerable reduction in the number of measured values. In a step 103, individual classes are screened out. One criterion for screening out an entire class consists in that the class contains less than a predefined number of measured values. In a step 104, the measured values reduced in number are used for further processing. Further processing is, in particular, a simulation and/or a draft design of the technical system.

FIG. 2 shows a schematic sketch of a recovery boiler. In the following text, by using the example of a "recovery boiler", an exemplary embodiment of the method described above will be illustrated.

In the paper and pulp industry, various chemicals and also heat and electrical power are needed for the digestion of pulp. With the aid of the recovery boiler, the chemicals used and additional thermal energy may be recovered from a thickened waste process liquor (black liquor). A measure of the recovery of the chemicals is of critical importance for the economy of the overall plant.

The black liquor is burned in a char bed 201. In the process, an alkaline melt is produced and flows away via a line 202. In further process steps, the chemicals used are recovered from the constituents of the alkaline melt. Heat of combustion which is released is used to generate steam. The combustion of the waste liquor and therefore the recovery of the chemicals begins with the atomization of the black liquor via atomizer nozzles 204 into a combustion chamber 203. As they fall through the hot flue gas, particles of the atomized black liquor are dried. The dried liquor particles fall onto the char bed 201, first combustion and chemical reduction taking place. Volatile constituents and reaction products pass into an oxidation zone, in which oxidizing reactions proceed and in which the combustion is completed.

Important objectives for the control of the recovery boiler are the steam production in order to obtain power, compliance with emission values from environmental points of view and the efficiency of the chemical reduction.

The combustion operation, and therefore the objectives, are controlled in particular by the supply of air at three levels (primary air (PA), secondary air (SA), tertiary air (TA)). The overall process is subject to numerous influences, which have to be taken into account during the modeling:

a) the measurement of the variables is subject to fluctuations which are often extreme;
b) influencing variables which are not measured and cannot be measured exist;
c) at each alteration to the settable parameters transient processes occur;
d) the technical plant becomes soiled and is cleaned at predefined intervals, which has the effect of a drift over time in each case in the system behavior.

The measured variables of the overall process are subdivided into input variables (cf. FIG. 3) and output variables (cf. FIG. 5). Measured variables are stored every minute. Four of the input variables are simultaneously also actuating variables (also: settable parameters; cf. FIG. 4). The actuating variables are to be viewed substantially as free parameters of the overall process which can be set independently of one another. Some of the other input variables are more or less dependent on the actuating variables. According to one predefinition, the variables "BL Front Pressure" and "BL Back Pressure" are always to be regulated equally in the recovery boiler. The four actuating variables (cf. FIG. 4) are preferably to be stored as actuating variables (with the desired, preset value) and as input variables (with the measured, actual value).

In the recovery boiler, one problem consists in the fact that, depending on the settable parameters, specific objectives, which are defined via measured variables, have to be met. Here, a three-stage procedure is selected in order to solve the problem:

1. The objectives to be considered are modeled by means of stochastic methods, these models being updated by means of new measurements (data-driven, empirical modeling). In this case, it is expedient to use not just a single model but global models for the identification of interesting areas in a parameter space determined by the objectives, and to use local models for the exact calculation of optimum operating points. The models used are assessed by means of quality measures.
2. If the models considered are not sufficiently accurate because of the state of the data (quality measure), new operating points are deliberately evaluated in order to improve the model (experimental design). In addition, by using global stochastic optimization methods with regard to the objectives, attractive regions are identified on the basis of the current global model.
3. For the local optimization, local models are constructed, and the data sets which are available are, if appropriate, deliberately expanded (experimental design).

The objectives are physical/technical or economic criteria which, as a rule, have to meet boundary conditions and/or safety conditions. It is often the case that a number of these criteria have to be considered at the same time. A stochastic model can be used in particular for the purpose of simulating the objectives to be optimized and their dependence on the parameters to be set in the computer. This is necessary when measurements are very costly or very time-consuming. In the case of safety requirements, possible hazardous situations can be avoided.

In the case of the recovery boiler, on-line optimization, which is based on a plurality of items of data, is necessary, since the physical/chemical processes cannot be modeled quantitatively with sufficient accuracy and because the behavior of the plant is subject to fluctuations in the course of operation. The knowledge about this behavior must continually be expanded by means of the deliberate selection of new operating points. Therefore, within the context of on-line optimization, the above-described three-stage procedure of stochastic modeling at mathematical optimization is to be recommended.

Description of the Input Variables

The a input variables (a∈N, N: set of natural numbers) generally depend on n actuating variables n∈N and on random effects. They can be described as follows: Let $(\Omega, S, P)$ be a probability space and $B^v$ be a Borel σ-algebra over $R^v$ (R: set of real numbers) for each v∈N. The input variables are represented by a projection φ which can be measured via $B^n \times S - B^a$:

$$\phi: R^n \times \Omega \to R^a \quad (1).$$

The definition set of the projection φ is a Cartesian product of two sets. If one considers the respective projections onto the individual sets, then the following projections are obtained:

$$\phi_x: \Omega \to R^a, \omega \to \phi(x, \omega) \text{ for all, } x \in R^n \quad (2),$$

$$\phi^\omega: R^n \to R^a, x \to \phi(x, \omega) \text{ for all } \omega \in \Omega \quad (3).$$

$\{\phi_x; x \in R^n\}$ is a stochastic process having an index set $R^n$ and a projection $\phi^\omega$ is a path in this stochastic process for each event ω∈Ω.

In the case of the recovery boiler, n=4 and a=14 (following the elimination of the variable "BL Back Pressure").

Because of the required ability to measure the projection $\phi_x$ for each x∈$R^n$, the projection $\phi_x$ is a random variable. Under suitable additional preconditions, expected values and higher moments can be considered. This access makes the step possible from stochastic models to deterministic optimization problems. In the case of a deterministic optimization problem, the target function can be set directly by means of a variable, while the stochastic variable influences the target function but does not permit any deliberate setting.

Description of the Output Variables

The process model M of the recovery boiler will be described as a function depending on the input variables and further random effects. In this case, let $(\Omega, S, P)$ be the above probability space. The process model M is then a projection which can be measured by $B^a \times S - B^b$:

$$M: R^a \times \Omega \to R^b \quad (4)$$

where b refers to the number of output variables.

Since the recovery boiler is subject to a cyclic drift over time (from cleaning phase to cleaning phase), a description using a time parameter is also conceivable. The output variables may be represented by projections that can be measured by $B^n \times S - B^b$:

$$\psi: R^n \times \Omega \to R^b \quad (5),$$

$$(x, \omega) \to M(\phi(x, \omega)), \omega) \quad (6).$$

If the respective projections onto the individual sets of the definition set are considered, then the following projections are obtained $$\psi_x: \Omega \to R^b, \omega \to \psi(x, \omega) \text{ for all, } x \in R^n \quad (7),$$

$$\psi^\omega: R^n \to R^b, x \to \psi(x, \omega) \text{ for all } \omega \in \Omega \quad (8).$$

$\{\psi_x; x \in R^n\}$ is a stochastic process having an index set $R^n$, and the projection $\psi^\omega$ is a path in this stochastic process for each ω∈Ω. In the recovery boiler, b=15.

The fact that, when defining ψ, no distinction is drawn between the events ω used, does not mean that there is any restriction, since Ω can be represented as a cartesian product of an Ω1 and an Ω2. The above representation therefore also comprises the model:

$$\psi: R^n \times \Omega_1 \times \Omega_2 \to R^b \quad (9),$$

$$(x, \omega_1, \omega_2) \to M(\phi(x, \omega_1), \omega_2) \quad (10).$$

Description of the Data Sets Available

Using the descriptions in the two preceding sections, it is possible to combine the input variables and the output variables together to form measured variables Φ. Φ is a projection that can be measured by $B^n \times S - B^m$, where m=a+b, and $$\Phi: R^n \times \Omega \to R^m \quad (11),$$

$$(x, \omega) \to \begin{pmatrix} \varphi(x, \omega) \\ \psi(x, \omega) \end{pmatrix}. \quad (12)$$

If the respective projections onto the individual sets of the definition set are considered again, then the following projections are obtained:

$$\Phi_x: \Omega \to R^m, \omega \to \Phi(x, \omega) \text{ for all, } x \in R^n \quad (13),$$

$$\Phi^\omega: R^n \to R^m, x \to \Phi(x, \omega) \text{ for all } \omega \in \Omega \quad (14).$$

$\{\Phi_x; x \in R^n\}$ is a stochastic process with an index set $R^n$ and the projection $\Phi^\omega$ is a path in this stochastic process for each ω∈Ω.

For each chosen tuple x of actuating variables, a large number of implementations of $\Phi_x$ in the recovery boiler are determined and stored, that is to say for each $x_j \in R^n$, numerous implementations $$\Phi_{jk} := \Phi(x_j, \omega_{jk}) \quad (15)$$

with $\omega_{jk} \in \Omega$; k=1,2, ..., $v_j$;

$v_j \in N$; j=1,2, ..., u; u∈N are considered. The stored data sets Djk of the recovery boiler are therefore (n+m) tuples:

$$D_{jk} = \begin{pmatrix} x_j \\ \Phi_{jk} \end{pmatrix}, \; k = 1, 2, \ldots, v_j; j = 1, 2, \ldots, u. \quad (16)$$

Here, $D_{j1k1}$ is stored before $D_{j2k2}$ if $$(j_1 < j_2) \lor ((j_1 = j_2) \land (k_1 < k_2))$$

Data Compression by Dividing the Classes of Parameters

Since, for each tuple x of actuating variables, there are generally a number of implementations of $\Phi_x$, because of the complex stochastic properties of the process to be considered, the first step in the statistical data analysis is obviously to divide the classes of parameters by forming arithmetic averages. In addition, obviously erroneous data sets are separated out. An obviously erroneous data set is, for example, a physically impossible measurement which cannot possibly occur in real terms, in particular on the basis of a setting which has been made.

Procedure:
1. Data sets in which the variable "BL Front Pressure" is not equal to the variable "BL Back Pressure" are screened out, since these two values must be equal according to the predefinition of the plant control system. The loss of data is very small.
2. The data sets are divided into classes in which the four setting parameters (PA, SA, TA, BL Front Pressure, see above) are successively constant overtime, that is to say the jth class consists of the data sets $D_j^*$.
3. Classes in which there are fewer than 30 data sets are screened out, in order that transient processes do not have any great influence.
4. For each class, an arithmetic average $\overline{\Phi}j$ and an empirical standard deviation sj are determined for all the measured variables:

$$\overline{\Phi}_j = \frac{1}{v_j} \cdot \sum_{k=1}^{v_j} \Phi_{jk}, \quad (17)$$

$$s_j = \begin{pmatrix} \left(\frac{1}{v_j-1} \cdot \sum_{k=1}^{v_j} (\Phi_{jk}^{(1)} - \overline{\Phi}_j^{(1)})^2\right)^{\frac{1}{2}} \\ \vdots \\ \left(\frac{1}{v_j-1} \cdot \sum_{k=1}^{v_j} (\Phi_{jk}^{(m)} - \overline{\Phi}_j^{(m)})^2\right)^{\frac{1}{2}} \end{pmatrix}. \quad (18)$$

5. Classes in which the averages for the variables PA, SA, TA or BL Front Pressure are too far removed from the corresponding setting parameters are screened out. In these classes, therefore, the setting values could not be reached.

Characteristic Statistical Variables for the Given Classes and their Graphical Representation In addition to the arithmetic averages and the empirical standard deviations which have been determined for the individual classes, a common standard deviation s is further determined in accordance with $$s = \begin{pmatrix} \left(\frac{1}{v-1} \cdot \sum_{j=1}^{u} (v_j-1)s_j^{(1)2}\right)^{\frac{1}{2}} \\ \vdots \\ \left(\frac{1}{v-1} \cdot \sum_{j=1}^{u} (v_j-1)s_j^{(m)2}\right)^{\frac{1}{2}} \end{pmatrix} \quad (19)$$

Here, u stands for the number of classes (205 here) and v for the sum of $v_j$, that is to say v is the number of all the measured values used (38,915 here).

Although other modifications and changes may be suggested by those skilled in the art, it is the intention of the inventors to embody within the patent warranted hereon all changes and modifications as reasonably and properly come within the scope of their contribution to the art.

We claim:

1. A method for modeling a technical process of an engineering plant, comprising:

measuring an initial set of empirical values at various steps of a technical process using sensors while said technical process is operating based on a predetermined set of parameters;

screening out a set of empirical values from the initial set of empirical values for reducing a size of the initial set of empirical values to obtain a screened set of empirical values by:

dividing the initial set of empirical values into classes based on a predefined criteria, followed by assessing each empirical value in each class with respect to a predefined first threshold value, and if a result of said assessing step lies below said predefined first threshold value, then screening out said empirical value, further assessing each class with respect to a predefined second threshold value, if a result of said assessing step lies below the second predefined threshold value, then, screening out said class; and modeling said technical process using said screened set of empirical values to obtain a model result, wherein the predefined criteria is said dividing step is based on the predetermined first set of parameters.

2. A method for modeling a technical process of an engineering plant, comprising:

measuring an initial set of empirical values at various steps of a technical process using sensors while said technical process is operating based on a predetermined set of parameters;

screening out a set of empirical values from the initial set of empirical values for reducing a size of the initial set of empirical values to obtain a screened set of empirical values by:

dividing the initial set of empirical values into classes based on a predefined criteria, followed by assessing each empirical value in each class with respect to a predefined first threshold value, and if a result of said assessing step lies below said predefined first threshold value, then screening out said empirical value, further assessing each class with respect to a predefined second threshold value, if a result of said assessing step lies below the second predefined threshold value, then, screening out said class; and modeling said technical process using said screened set of empirical values to obtain a model result;

determining an empirical value associated with a transient phase of the technical process resulting from a modification of the predetermined set of parameters; and screening out the empirical value associated with the transient phase.

3. A method according to claim 1, further comprising the step of:

reducing a number of empirical values in a class by selecting a representative empirical value for the class.

4. A method according to claim 3, wherein the representative empirical value is an average of the empirical values in the class.

5. A method according to claim 3, wherein the representative empirical value is one of a maximum value and a minimum value of the empirical values in the class.

6. A method according to claim 3, wherein the representative empirical value is a median of the empirical values in the class.

7. A method for modeling a technical process of an engineering plant, comprising:

measuring an initial set of empirical values at various steps of a technical process using sensors while said technical process is operating based on a predetermined set of parameters;

screening out a set of empirical values from the initial set of empirical values for reducing a size of the initial set of empirical values to obtain a screened set of empirical values by:

dividing the initial set of empirical values into classes based on a predefined criteria, followed by assessing each empirical value in each class with respect to a predefined first threshold value, and if a result of said assessing step lies below said predefined first threshold value, then screening out said empirical value, further assessing each class with respect to a predefined second threshold value, if a result of said assessing step lies below the second predefined threshold value, then, screening out said class; and modeling said technical process using said screened set of empirical values to obtain a model result; and screening out a class with fewer number of empirical values than a predefined number.

8. A method for modeling a technical process of an engineering plant, comprising:

measuring an initial set of empirical values at various steps of a technical process using sensors while said technical process is operating based on a predetermined set of parameters;

screening out a set of empirical values from the initial set of empirical values for reducing a size of the initial set of empirical values to obtain a screened set of empirical values by:

dividing the initial set of empirical values into classes based on a predefined criteria, followed by assessing each empirical value in each class with respect to a predefined first threshold value, and if a result of said assessing step lies below said predefined first threshold value, then screening out said empirical value, further assessing each class with respect to a predefined second threshold value, if a result of said assessing step lies below the second predefined threshold value, then, screening out said class; and modeling said technical process using said screened set of empirical values to obtain a model result, wherein the result of said assessing step is a difference of the empirical value in the class with the predefined first threshold value.

9. A system for modeling a technical process of an engineering plant, comprising:

a series of sensors for measuring and acquiring an initial set of empirical values at various stages of the technical process while the technical process is operating based on a predetermined set of parameters; and a central processing unit being supplied with the initial set of empirical values, which screens a set of empirical values out of the initial set of empirical values using a screening algorithm to obtain a screened set of empirical values by: a division of the first set of empirical values in to classes based on a predetermined criteria, followed by an assessment of an empirical value within a class with respect to a predefined first threshold value, if a result of the assessment lies below a predefined first threshold value, then, the empirical value is screened out; and a further assessment of the class with respect to a predefined second threshold value; if a result of the further assessment lie below the second predefined threshold, then, screening out the class, said screened set of empirical values utilized for a simulation of the technical process to obtain a model result, wherein the predefined criteria in said division step is based on the predetermined set of parameters.

* * * * *